(12) United States Patent
Liu et al.

(10) Patent No.: US 11,209,596 B2
(45) Date of Patent: Dec. 28, 2021

(54) TAPERED SIDE-POLISHED FIBER-OPTIC BIOSENSOR AND METHOD FOR PREPARING TAPERED SIDE-POLISHED FIBER

(71) Applicant: Nanchang Hangkong University, Nanchang (CN)

(72) Inventors: Bin Liu, Nanchang (CN); Wei Luo, Nanchang (CN); Qiang Wu, Nanchang (CN); Juan Liu, Nanchang (CN); Shengpeng Wan, Nanchang (CN); Xingdao He, Nanchang (CN)

(73) Assignee: NANCHANG HANGKONG UNIVERSITY, Nanchang (CN)

( * ) Notice: Subject to any disclaimer, the term of this patent is extended or adjusted under 35 U.S.C. 154(b) by 35 days.

(21) Appl. No.: 16/909,550

(22) Filed: Jun. 23, 2020

(65) Prior Publication Data

US 2021/0181420 A1 Jun. 17, 2021

(30) Foreign Application Priority Data

Dec. 11, 2019 (CN) .......................... 201911265735.6

(51) Int. Cl.
*G02B 6/28* (2006.01)
*F21V 8/00* (2006.01)
(Continued)

(52) U.S. Cl.
CPC ......... *G02B 6/2826* (2013.01); *G02B 6/0046* (2013.01); *G01N 15/1436* (2013.01);
(Continued)

(58) Field of Classification Search
CPC .. G02B 6/2826; G02B 6/0046; G02B 6/0846; G02B 6/262; G01N 2201/0846;
(Continued)

(56) References Cited

U.S. PATENT DOCUMENTS 6,445,851 B1 * 9/2002 Rakuljic ................ G02B 6/021
385/123
2003/0109055 A1 * 6/2003 Lehmann ............... G01N 21/39
436/164

(Continued)

OTHER PUBLICATIONS

Rijal et al., Detection of pathogen *Escherichia coli* 0157:H7 At 70 cells/mL using antibody-immobilized biconical tapered fiber sensors, Biosens Bioelectron. Dec. 15, 2005;21(6):871-80. (Year: 2005).*

*Primary Examiner* — Ryan A Lepisto
*Assistant Examiner* — Erin D Chiem
(74) *Attorney, Agent, or Firm* — Bacon & Thomas, PLLC

(57) ABSTRACT

The present invention provides a tapered side-polished fiber-optic biosensor (FOBS) and a method for preparing a tapered side-polished fiber (SPF). The biosensor includes a broadband light source, a first single-mode fiber, a tapered SPF, a second single-mode fiber, and a spectrometer. The broadband light source is connected to the tapered SPF through the first single-mode fiber, and the tapered SPF is connected to the spectrometer through the second single-mode fiber. The broadband light source is configured to emit a light wave. The spectrometer is configured to display a spectrum corresponding to a light wave passing through the first single-mode fiber, the tapered SPF, and the second single-mode fiber successively. In the present invention, a fiber side-polishing technology is combined with a fiber tapering technology to construct a tapered SPF, and a spectrum changes by changing a refractive index around a side-polished tapered region, thereby measuring the refractive index. In addition, the tapered SPF provided in the present invention can generate a Vernier effect, thereby improving the sensor's anti-electromagnetic interference and sensitivity to refractive index measurement.

8 Claims, 3 Drawing Sheets

(51) Int. Cl.
    *G01N 21/01*           (2006.01)
    *G01N 21/64*           (2006.01)
    *G01N 15/14*           (2006.01)
    *G01N 21/41*           (2006.01)
    *G02B 6/26*            (2006.01)
    *G01N 21/25*           (2006.01)

(52) U.S. Cl.
    CPC ..... *G01N 21/01* (2013.01); *G01N 2021/6484* (2013.01); *G01N 2201/088* (2013.01)

(58) Field of Classification Search
    CPC ..... G01N 2201/6484; G01N 2201/088; G01N 21/41; G01N 21/4133; G01N 21/01; G01N 21/255; G01N 15/1436
    See application file for complete search history.

(56) References Cited

U.S. PATENT DOCUMENTS

| | | | | |
|---|---|---|---|---|
| 2009/0304551 | A1* | 12/2009 | Mutharasan | G01N 33/54373 422/82.11 |
| 2013/0120752 | A1* | 5/2013 | Lee | G02B 6/02 356/445 |
| 2016/0370288 | A1* | 12/2016 | Ozdemir | G01N 15/1459 |
| 2017/0328836 | A1* | 11/2017 | Lu | G02B 6/032 |
| 2018/0143133 | A1* | 5/2018 | Viegas | G01N 21/7703 |

* cited by examiner

TAPERED SIDE-POLISHED FIBER-OPTIC BIOSENSOR AND METHOD FOR PREPARING TAPERED SIDE-POLISHED FIBER

TECHNICAL FIELD

The present invention relates to the field of fiber sensing technologies, and in particular, to a tapered side-polished fiber-optic biosensor (FOBS) and a method for preparing a tapered side-polished fiber (SPF).

BACKGROUND

In the past few decades, the rapid development of fiber optic communication and optoelectronic technologies promotes the comprehensive development of fiber sensing technologies. Optical sensors are widely applied to fields such as construction engineering, power industry, aerospace and navigation, environmental detection, and biochemical sensing due to a small size, light weight, anti-electromagnetic interference corrosion resistance, high sensitivity, bendability, and point-to-point and distributed measurement. The United States first developed fiber sensors such as a fiber optic gyroscope, a hydrophone, a magnetometer, and a fiber sensor used for nuclear radiation monitoring. At present, the fiber sensors have been widely used from military to civilian.

As an important direction for biosensor research, the most widely used label-free fiber sensors currently include a surface plasmon resonance biosensor, an optical resonance biosensor, and a photonic crystal biosensor. The surface plasmon resonance biosensor requires a surface plasmon resonator, and a metal layer needs to be thick enough to excite a surface plasmon. However, because a thickness cannot be accurately controlled and a detection limit is very large, sensitivity to biomolecules at low concentration is not high. A free spectral range and a quality factor of the single optical resonance biosensor are not high, which cannot meet a detection requirement of biomolecules at low concentration. Although the single optical resonance biosensor can be optimized through a topology, a structure becomes complicated, making the process more difficult. In addition, it is difficult for the photonic crystal biosensor to overcome repeatability, selectivity, and anti-interference, and sensitivity thereof is lower than other sensors.

SUMMARY

In view of the above, the present invention provides a tapered side-polished fiber-optic biosensor (FOBS), to improve the sensor's anti-electromagnetic interference and sensitivity to a refractive index.

To achieve the above purpose, the present invention provides a tapered side-polished FOBS, where the biosensor includes: a broadband light source, a first single-mode fiber, a tapered side-polished fiber (SPF), a second single-mode fiber, and a spectrometer, where the broadband light source is connected to the tapered SPF through the first single-mode fiber, and the tapered SPF is connected to the spectrometer through the second single-mode fiber; the broadband light source is configured to emit a light wave; and the spectrometer is configured to display a spectrum corresponding to a light wave passing through the first single-mode fiber, the tapered SPF, and the second single-mode fiber successively.

Optionally, a taper length L of the tapered SPF ranges from 2 mm to 60 mm, a radius R of a taper waist region of the tapered SPF ranges from 0.5 μm to 10 μm, and a range of a side-polished depth d of the taper waist region after tapering the SPF is 0.5R-1R.

Optionally, the taper length L of the tapered SPF ranges from 20 mm to 60 mm, the radius R of the taper waist region of the tapered SPF ranges from 2 μm to 10 μm, and the range of the side-polished depth d of the taper waist region after tapering the SPF is 0.5R-1R.

Optionally, the tapered SPF is a non-circular symmetric fiber.

Optionally, a formula for an output power of the first single-mode fiber is:

$$P'_{out} \frac{P'_{in}}{2}\left(1 + \cos\left(\frac{\varphi_x - \varphi_y}{2}\right)\cos\left(\frac{\varphi_x + \varphi_y}{2}\right)\right),$$

where $P_{out}'$ is the output power of the first single-mode fiber, $\varphi_x$ is a phase difference between an even mode and an odd mode in an x polarization state accumulated in a coupling region, $\varphi_y$ is a phase difference between an even mode and an odd mode in a y polarization state accumulated in the coupling region, and $P_{in}'$ is an input power of the first single-mode fiber.

Optionally, a formula for an output power of the second single-mode fiber is:

$$P''_{out} P_x \cos^2\left(\frac{1}{2}\varphi_x\right) + P_y \cos^2\left(\frac{1}{2}\varphi_y\right),$$

where $P_{out}''$ is the output power of the second single-mode fiber, $P_x$ is an optical power of an x polarization in an incident light, $P_y$ is an optical power of a y polarization in the incident light, $\varphi_x$ is a phase difference between an even mode and an odd mode in an x polarization state accumulated in a coupling region, and $\varphi_y$ is a phase difference between an even mode and an odd mode in a y polarization state accumulated in the coupling region.

The present invention further provides a method for preparing a tapered side-polished fiber (SPF), where the method includes:

performing side-polishing on a third single-mode fiber by using a wheeled fiber side-polishing system to obtain a SPF; and performing tapering on the SPF by using a taper machine to obtain a tapered SPF.

Optionally, the performing side-polishing on a third single-mode fiber by using a wheeled fiber side-polishing system to obtain a SPF specifically includes:

clamping one end of the third single-mode fiber by using a fiber fixture, and then peeling off a coating layer of a specified thickness from the middle of the third single-mode fiber by using Miller pliers;

repeatedly rubbing the third single-mode fiber whose coating layer is peeled off by using a lens-cleaning paper moistened with alcohol until the third single-mode fiber is clean;

bypassing the cleaned third single-mode fiber from a grinding wheel, bringing the third single-mode fiber whose coating layer is peeled off into close contact with the grinding wheel, and then clamping the other end of the third single-mode fiber by using the fiber fixture; and adjusting a translation stage under the fiber fixture to move along an x-axis direction, so that the third single-mode fiber whose coating layer is peeled off is subjected to a specified tensile force and then is polished to obtain the SPF.

Optionally, the performing tapering on the SPF by using a taper machine to obtain a tapered SPF specifically includes:

welding one jumper at each of two ends of the SPF, and then turning on a power switch of the taper machine to start the taper machine;

after the taper machine is initialized, entering a parameter interface in control software of the taper machine, and inputting a taper parameter;

igniting a flame head with an igniter, turning on a vacuum pump, placing the SPF on a vacuum adsorption fixture with the flame head aligned, and confirming that the SPF is firmly attached to the fixture until a suction sound of the vacuum pump cannot be heard; and connecting one end of the SPF to the broadband light source and the other end to the spectrometer, pressing a START button to start tapering, and when a preset interference spectrum is obtained through observing of the spectrometer, stopping the tapering and encapsulating the SPF to obtain the tapered SPF.

According to specific embodiments provided in the present invention, the present invention discloses the following technical effects.

The present invention provides a tapered side-polished FOBS and a method for preparing a tapered SPF. The biosensor includes a broadband light source, a first single-mode fiber, a tapered SPF, a second single-mode fiber, and a spectrometer. The broadband light source is connected to the tapered SPF through the first single-mode fiber, and the tapered SPF is connected to the spectrometer through the second single-mode fiber. The broadband light source is configured to emit a light wave. The spectrometer is configured to display a spectrum corresponding to a light wave passing through the first single-mode fiber, the tapered SPF, and the second single-mode fiber successively. In the present invention, a fiber side-polishing technology is combined with a fiber tapering technology to construct a tapered SPF, and a spectrum changes by changing a refractive index around a side-polished tapered region, thereby measuring the refractive index. In addition, the tapered SPF provided in the present invention can generate a Vernier effect, thereby improving the sensor's anti-electromagnetic interference and sensitivity to refractive index measurement.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

Figure 1:
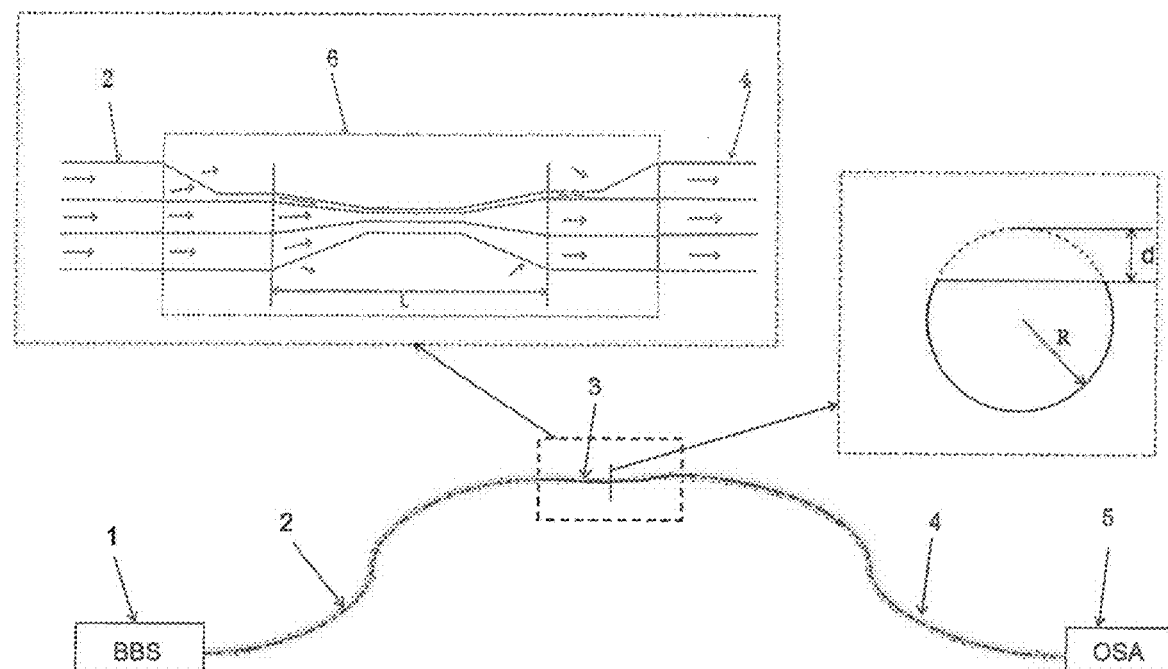
FIG. 1 is a schematic diagram of an overall structure of a tapered side-polished FOBS according to an embodiment of the present invention.

Reference numerals: 1. Broadband light source; 2. First single-mode fiber; 3. Tapered SPF; 4. Second single-mode fiber; 5. Spectrometer; 6. Side-polished tapered region.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In view of the above, the present invention provides a tapered side-polished FOBS, to improve the sensor's anti-electromagnetic interference and sensitivity to refractive index measurement.

In order to make the above objects, features, and advantages of the present invention more apparent, the present invention will be further described in detail in connection with the accompanying drawings and the detailed description.

Figure 2:
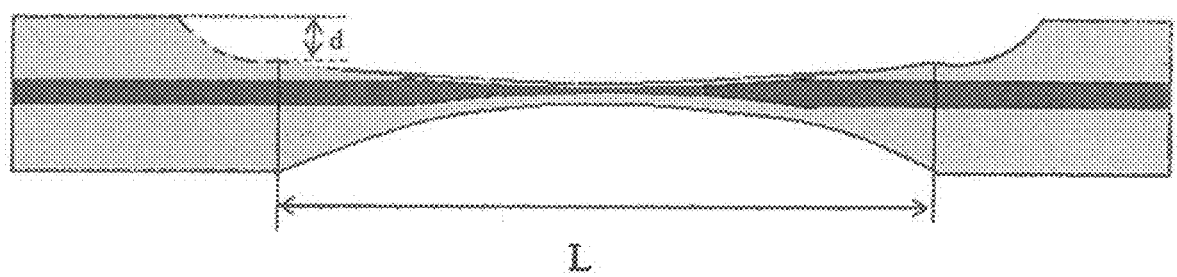
FIG. 2 is a schematic structural diagram of a tapered SPF according to an embodiment of the present invention.

FIG. 1 is a schematic diagram of an overall structure of a tapered side-polished FOBS according to an embodiment of the present invention. FIG. 2 is a schematic structural diagram of a tapered SPF according to an embodiment of the present invention. The biosensor includes: a broadband light source 1, a first single-mode fiber 2, a tapered SPF 3, a second single-mode fiber 4, and a spectrometer 5, where the broadband light source 1 is connected to the tapered SPF 3 through the first single-mode fiber 2, and the tapered SPF 3 is connected to the spectrometer 5 through the second single-mode fiber 4; the broadband light source 1 is configured to emit a light wave; and the spectrometer 5 is configured to display a spectrum corresponding to a light wave passing through the first single-mode fiber 2, the tapered SPF 3, and the second single-mode fiber 4 successively.

In an implementation of the present invention, a taper length L of the tapered SPF 3 ranges from 2 mm to 60 mm. Preferably, the taper length L of the tapered SPF 3 ranges from 20 mm to 60 mm. Further, the taper length L of the tapered SPF 3 is preferably any one of 30 mm, 35 mm, 40 mm, 45 mm, 50 mm, and 55 mm.

In an implementation of the present invention, a radius R of a taper waist region of the tapered SPF 3 ranges from 0.5 μm to 10 μm. Preferably, the radius R of the taper waist region of the tapered SPF 3 ranges from 2 μm to 10 μm. Further, the radius R of the taper waist region of the tapered SPF 3 is preferably any one of 3 μm, 4 μm, 5 μm, 6 μm, 7 μm, 8 μm, and 9 μm.

In an implementation of the present invention, a range of the side-polished depth d of the taper waist region after tapering the SPF 3 is 0.5R-1R. Preferably, the range of the side-polished depth d of the taper waist region after the SPF 3 taper is 0.5R-1R. Further, the side-polished depth d of the taper waist region after tapering the SPF 3 is preferably any one of 0.6 R, 0.7 R, 0.8 R, and 0.9 R.

In an implementation of the present invention, the tapered SPF 3 is a non-circular symmetric fiber. The tapered SPF 3 is obtained by performing side-polishing and tapering on a third single-mode fiber.

In an implementation of the present invention, the first single-mode fiber 2, the second single-mode fiber 4, and the third single-mode fiber are integrated, and are the same type of single-mode fiber.

The present invention further provides a method for preparing a tapered SPF. The method includes:

Step S1: Perform side-polishing on a third single-mode fiber by using a wheeled fiber side-polishing system to obtain a SPF.

Step S2: Perform tapering on the SPF by using a taper machine to obtain a tapered SPF.

The performing side-polishing on a third single-mode fiber by using a wheeled fiber side-polishing system to obtain a SPF in step S specifically includes:

Step S11: Clamp one end of the third single-mode fiber by using a fiber fixture, and then peel off a coating layer of a specified thickness from the middle of the third single-mode fiber by using Miller pliers.

Step S12: Repeatedly rub the third single-mode fiber whose coating layer is peeled off by using a lens-cleaning paper moistened with alcohol until the third single-mode fiber is clean.

Step S13: Bypass the cleaned third single-mode fiber from a grinding wheel, bring the third single-mode fiber whose coating layer is peeled off into close contact with the grinding wheel, and then clamp the other end of the third single-mode fiber by using the fiber fixture.

Step S14: Adjust a translation stage under the fiber fixture to move along an x-axis direction, so that the third single-mode fiber whose coating layer is peeled off is subjected to a specified tensile force and then is polished to obtain the SPF.

Step S15: Respectively connect two ends of the SPF to the light source and an optical power meter through a fiber adapter, and monitor a transmittance power of a single-mode fiber online through the optical power meter and the light source.

The performing tapering on the SPF by using a taper machine to obtain a tapered SPF in step S2 specifically includes:

Step S21: Weld one jumper at each of two ends of the SPF, and then turn on a power switch of the taper machine to start the taper machine.

Step S22: After the taper machine is initialized, enter a parameter interface in control software of the taper machine, and input a taper parameter.

Step S23: Ignite a flame head with an igniter, turn on a vacuum pump, place the SPF on a vacuum adsorption fixture with the flame head aligned, and confirm that the SPF is firmly attached to the fixture until a suction sound of the vacuum pump cannot be heard.

Step S24: Connect one end of the SPF to the broadband light source and the other end to the spectrometer, press a START button to start tapering, and when a preset interference spectrum is obtained through observing of the spectrometer, stop the tapering and encapsulate the SPF to obtain the tapered SPF.

According to the present invention, side-polishing is first performed on the third single-mode fiber, and then tapering is performed on the SPF, so that the tapered micro-nano fiber is non-circularly symmetric. In this way, a birefringence effect can be generated to implement incoherent superposition of interference in an x polarization direction and a y polarization direction at an output end. Therefore, an obvious Vernier effect is produced to amplify a wavelength drift caused by a refractive index of an environment, thereby significantly improving sensing performance of the micro-nano fiber. In addition, the tapered SPF has a strong evanescent field. Therefore, the evanescent field interacts with the external environment, and an emitted light wave in the tapered SPF changes with the refractive index of the external environment, thus producing a highly sensitive response to the refractive index of the external environment.

Figure 3:
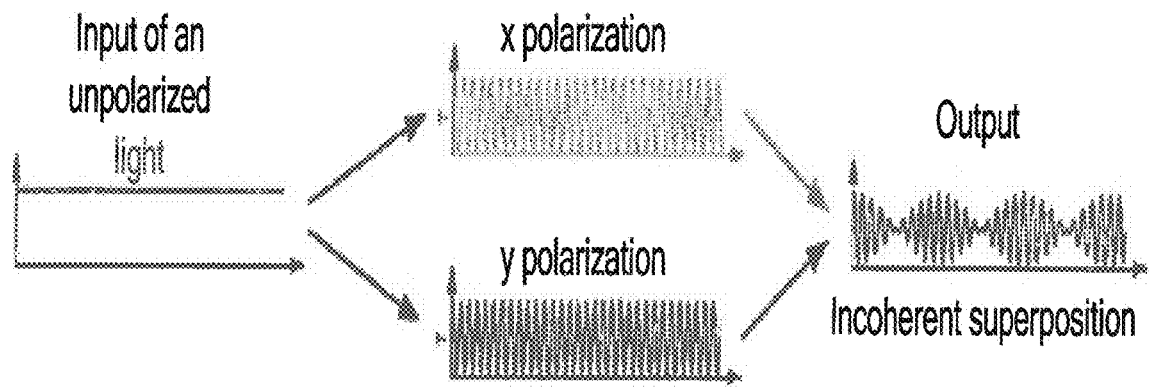
FIG. 3 is a principle diagram of non-coherent superposition of an x polarization and a y polarization in a taper waist region of a tapered SPF according to an embodiment of the present invention.

In order to explain the Vernier effect more intuitively, the tapered SPF is simulated. As shown in FIG. 3, when an unpolarized light is input, the unpolarized light can be orthogonally decomposed into a polarized light in an x direction and a polarized light in a y direction. An odd mode and an even mode in the x-polarization direction and an odd mode and an even mode in the y-polarization direction are excited in a side-polished tapered region, and the odd and even modes in the two polarization directions are propagated forward and have interference in a taper waist region of the tapered SPF, so that a corresponding interference spectrum is obtained at the output end. Because the tapered SPF is non-circularly symmetric, a birefringence effect is generated in the side-polished tapered region to implement incoherent superposition of interference spectra of two different polarizations with slightly different interference periods at the output end, thereby forming a Vernier effect.

Assuming that an optical power of an x polarization and an optical power of a y polarization in an incident light are $P_x$ and $P_y$ respectively, an output power of the second single-mode fiber is:

$$P''_{out} = P_x \cos^2\left(\frac{1}{2}\varphi_x\right) + p_y \cos^2\left(\frac{1}{2}\varphi_y\right) \qquad (5)$$

$P_{out}''$ is the output power of the second single-mode fiber, $P_x$ is the optical power of the x polarization in the incident light, $P_y$ is the optical power of the y polarization in the incident light, $\varphi_x$ is a phase difference between an even mode and an odd mode in an x polarization state accumulated in a coupling region, and $\varphi_y$ is a phase difference between an even mode and an odd mode in a y polarization state accumulated in the coupling region.

A phase difference between an even mode and an odd mode in a same polarization state can be expressed as:

$$\varphi_x = \frac{2\pi L(n_{even}^x - n_{odd}^x)}{\lambda} \qquad (6)$$

$$\varphi_x = \frac{2\pi L(n_{even}^y - n_{odd}^y)}{\lambda} \qquad (7)$$

$n_{even}^x$ is an effective refractive index of the even mode in the x polarization state, $n_{odd}^x$ is an effective refractive index of the odd mode in the x polarization state, $n_{even}^y$ is an effective refractive index of the even mode in the y polarization state, $n_{odd}^y$ is an effective refractive index of the odd mode in the y polarization state, $\lambda$ is a wavelength of the incident light, and L is an equivalent length of the coupling region.

Assuming that powers in the x polarization state and the y polarization state in the incident light are equal, that is, $P_x = P_y = P_{in}'/2$, where $P_{in}'$ is an input power of the first single-mode fiber. In this case, an output power of the first single-mode fiber is:

$$P_{out}' = \frac{P_{in}'}{2}\left(1 + \cos\left(\frac{\varphi_x - \varphi_y}{2}\right)\cos\left(\frac{\varphi_x + \varphi_y}{2}\right)\right) \tag{8}$$

$P_{out}'$ is the output power of the first single-mode fiber, $\varphi_x$ is a phase difference between an even mode and an odd mode in an x polarization state accumulated in a coupling region, $\varphi_y$ is a phase difference between an even mode and an odd mode in a y polarization state accumulated in the coupling region, and $P_{in}'$ is the input power of the first single-mode fiber.

Considering $$\cos\left(\frac{\varphi_x - \varphi_y}{2}\right)\cos\left(\frac{\varphi_x + \varphi_y}{2}\right)$$

as continuous carrier signals, a function of an upper envelope of a signal obtained through Hilbert transform is:

$$F_E = \frac{P_{in}'}{2}\left(1 \pm \cos\left(\frac{\varphi_x - \varphi_y}{2}\right)\right) \tag{9}$$

A function of a lower envelope of the signal is:

$$F_C = \frac{P_{in}'}{2}\left(1 - \left|\cos\left(\frac{\varphi_x - \varphi_y}{2}\right)\right|\right) = \frac{P_{in}'}{2}\left(1 - \left|\cos\left(\frac{\pi L(\Delta n_{eff}^x - \Delta n_{eff}^y)}{\lambda}\right)\right|\right) \tag{10}$$

$\Delta n_{eff}^x = n_{even}^x - n_{odd}^x$ and $\Delta n_{eff}^y = n_{even}^y - n_{odd}^y$, where $n_{even}^x$ is an effective refractive index of the even mode in the x polarization state, $n_{odd}^x$ is an effective refractive index of the odd mode in the x polarization state, $n_{even}^y$ is an effective refractive index of the even mode in the y polarization state, $n_{odd}^y$ is an effective refractive index of the odd mode in the y polarization state, $\lambda$ is a wavelength of the incident light, and L is an equivalent length of the coupling region.

A trough in a curve of the lower envelope satisfies:

$$\cos\left(\frac{\pi L(\Delta n_{eff}^x - \Delta n_{eff}^y)}{\lambda_N}\right) = \cos\left(\frac{\pi L(B_{even} - B_{odd})}{\lambda_N}\right) = \pm 1 \tag{11}$$

$B_{even} = n_{even}^x - n_{even}^y$ is a birefringence coefficient of the even mode in the tapered SPF, $B_{odd} = n_{odd}^x - n_{odd}^y$ is a birefringence coefficient of the odd mode in the tapered SPF, N represents an $N^{th}$ trough in the curve of the lower envelope, and $\lambda_N$ represents a wavelength corresponding to the $N^{th}$ trough.

$$\frac{\pi L(B_{even} - B_{odd})}{\lambda_N} = N\pi \tag{12}$$

A sensitivity formula for obtaining a refractive index of the tapered SPF by taking partial derivatives of a refractive index n on both sides of the equal sign of Formula (12) is:

$$S_v = \frac{\partial \lambda_N}{\partial n} = \frac{\lambda_N}{G_B^{even} - G_B^{odd}} \frac{\partial(B_{even} - B_{odd})}{\partial n} \tag{13}$$

$G_B^{even} = B_{even} - \lambda_N \partial B_{even}/\partial \lambda$ is a group birefringene coefficient of the even mode, an $G_B^{odd} = B_{odd} - \lambda_N \partial B_{odd}/\partial \lambda$ is a group birefringence coefficient of the odd mode.

Figure 4:
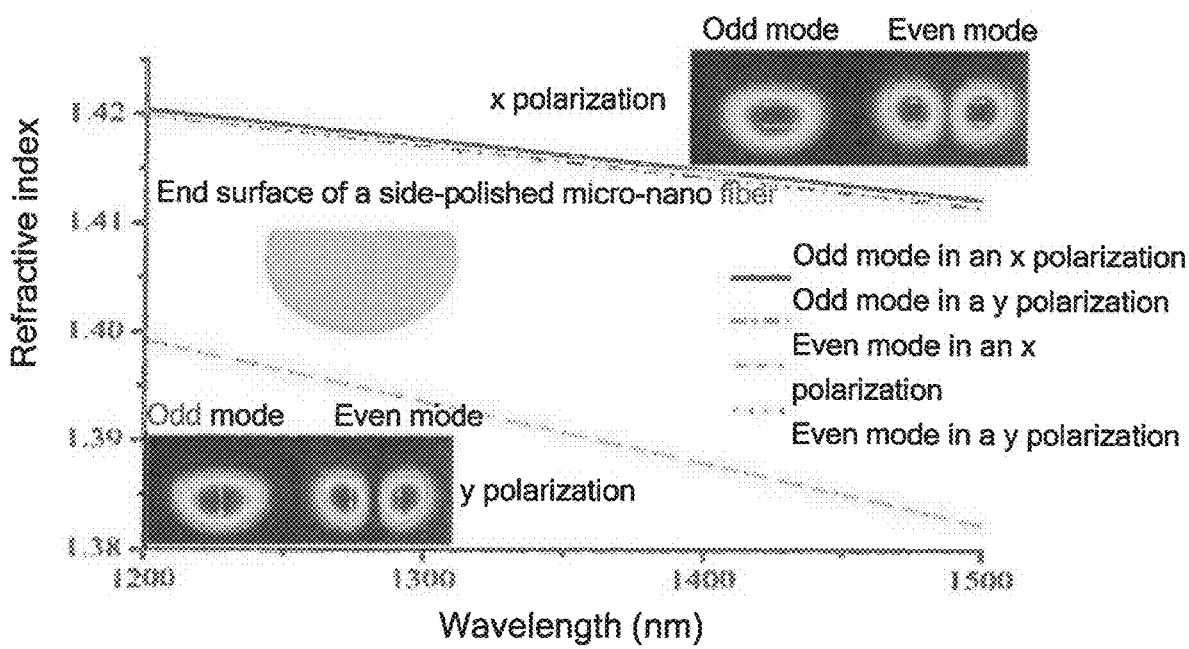
FIG. 4 shows a change in an equivalent refractive index of an odd mode and an even mode in a taper waist region of a tapered SPF according to an embodiment of the present invention.

FIG. 4 shows a change in an equivalent refractive index of an odd mode and an even mode in a taper waist region of a tapered SPF according to an embodiment of the present invention. In the figure, horizontal coordinates represent a wavelength and vertical coordinates represent a refractive index. It can be learned from FIG. 4 that an effective refractive index of an even mode in an x polarization or a y polarization is slightly greater than that of an odd mode, and all effective refractive indexes are smaller toward a longer wavelength. In addition, the effective refractive index of the odd mode in the x polarization is significantly greater than that in the y polarization, and the effective refractive indexes of the even mode in the two polarizations are very close. Therefore, it can be concluded that the odd mode mainly affects a phase difference.

Figure 5:
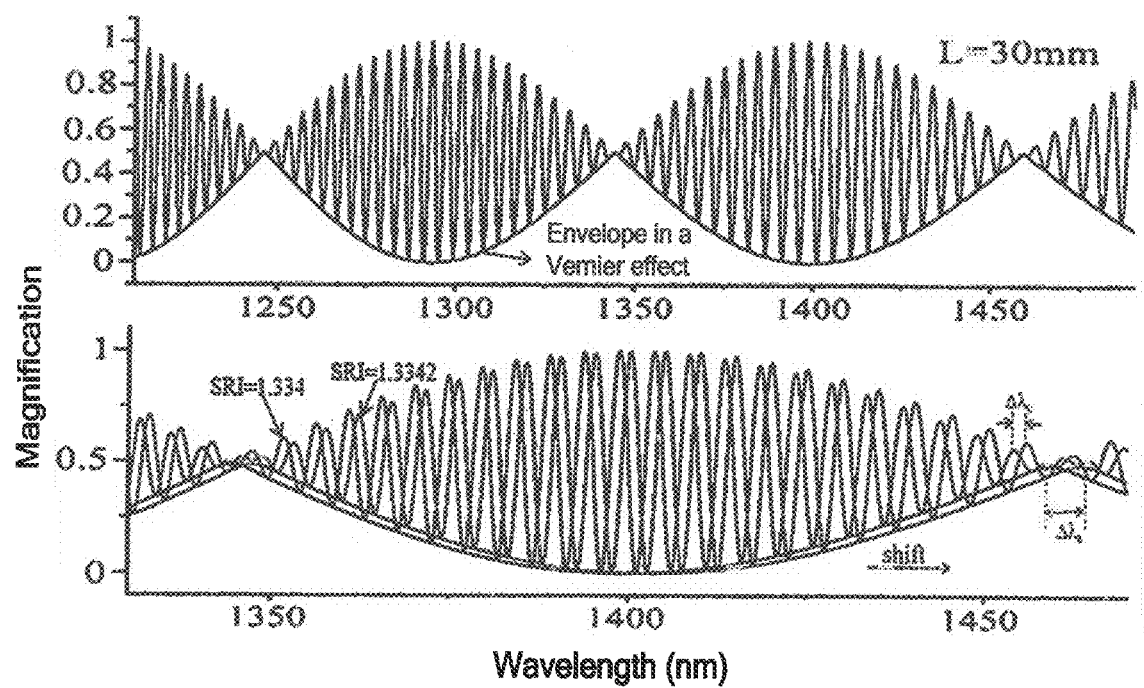
FIG. 5 is a curve diagram of a projection spectrum and an interference spectrum of a Vernier effect according to an embodiment of the present invention.

FIG. 5 is a curve diagram of a projection spectrum and an interference spectrum of a Vernier effect according to an embodiment of the present invention. As shown in FIG. 5, a taper length L of a tapered SPF that is simulated is 30 mm. When a refractive index around a side-polished tapered region changes from 1.334 to 1.3342, a redshift occurs in the spectrum. In this case, the shift is small, and a small wavelength offset can be magnified by M times through a Vernier effect. The magnification M can be expressed as:

$$M = \frac{\Delta\lambda_s}{\Delta\lambda_c} \tag{14}$$

$\Delta\lambda_c$ is an offset of a single peak, $\Delta\lambda_s$ and is an offset of an envelope in the Vernier effect.

Therefore, the Vernier effect can significantly improve sensing performance and implement refractive index measurement.

Example

Figure 6:
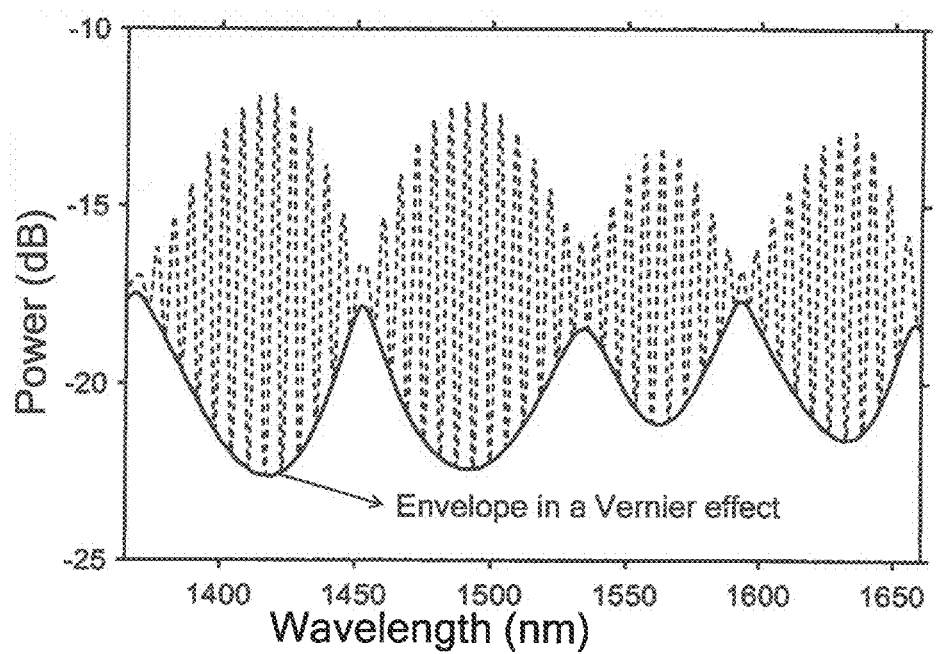
FIG. 6 is an interference spectrum of a Vernier effect according to an embodiment of the present invention.

In the present invention, a SPF is first prepared through side-polishing, and then fusion and tapering are performed on the SPF to obtain a tapered SPF. A taper length L is 30 mm, a radius R of a taper waist region is 2.332 μm, and a depth d of the tapered SPF is 2.15 um. As shown in FIG. 6, an obvious Vernier effect appears in a spectrum measured by a spectrometer in the air.

In the present invention, because the tapered SPF has SPF cladding, a mode of the cladding has low vulnerability, excellent mechanical properties, and high sensitivity. In addition, because the tapered SPF is non-circularly symmetric, a birefringence effect is generated to implement incoherent superposition of interference in an x polarization direction and a y polarization direction. Therefore, an obvious Vernier effect is produced to significantly improve sensing performance. In addition, the tapered side-polished FOBS in the present invention is characterized by high refractive index sensitivity, anti-electromagnetic interference, and corrosion resistance, has a small size and a simple structure, and is easy to operate. Therefore, an analyte can be directly detected by drilling holes in an object, thereby greatly increasing a response speed of the sensor.

Each embodiment of the present specification is described in a progressive manner, each embodiment focuses on the difference from other embodiments, and the same and similar parts between the embodiments may refer to each other.

In this paper, several examples are used for illustration of the principles and embodiments of the present invention. The description of the foregoing embodiments is used to help illustrate the method of the present invention and the core principles thereof. In addition, those skilled in the art can make various modifications in terms of specific embodiments and scope of application in accordance with the teachings of the present invention. In conclusion, the content of the present specification shall not be construed as a limitation to the present invention.

What is claimed is:

1. A tapered side-polished fiber-optic biosensor (FOBS), wherein the biosensor comprises:
    a broadband light source, a first single-mode fiber, a tapered side-polished fiber (SPF), a second single-mode fiber, and a spectrometer, wherein the broadband light source is connected to the tapered SPF through the first single-mode fiber, and the tapered SPF is connected to the spectrometer through the second single-mode fiber;
    the broadband light source is configured to emit a light wave; and
    the spectrometer is configured to display a spectrum corresponding to a light wave passing through the first single-mode fiber, the tapered SPF, and the second single-mode fiber successively;
    wherein a formula for an output power of the first single-mode fiber is:

$$P'_{out} = \frac{P'_{in}}{2}\left(1 + \cos\left(\frac{\varphi_x - \varphi_y}{2}\right)\cos\left(\frac{\varphi_x + \varphi_y}{2}\right)\right),$$

wherein
P'$_{out}$ is the output power of the first single-mode fiber, $\varphi_x$ is a phase difference between an even mode and an odd mode in an x polarization state accumulated in a coupling region, $\varphi_y$ is a phase difference between an even mode and an odd mode in the y polarization state accumulated in the coupling region, and P'$_{in}$ is in an input power of the first single-mode fiber.

2. The tapered side-polished FOBS according to claim 1, wherein a taper length L of the tapered SPF ranges from 2 mm to 60 mm, a radius R of a taper waist region of the tapered SPF ranges from 0.5 pm to 10 pm, and the range of the side-polished depth d of the taper waist region after tapering the SPF is 0.5R-1.5R.

3. The tapered side-polished FOBS according to claim 2, wherein the taper length L of the tapered SPF ranges from 20 mm to 60 mm, the radius R of the taper waist region of the tapered SPF ranges from 2 pm to 10 pm, and the range of the side-polished depth d of the taper waist region after tapering the SPF is 0.5R-1R.

4. The tapered side-polished FOBS according to claim 1, wherein the tapered SPF is a non-circular symmetric fiber.

5. A tapered side-polished fiber-optic biosensor (FOBS), wherein the biosensor comprises:
    a broadband light source, a first single-mode fiber, a tapered side-polished fiber (SPF), a second single-mode fiber, and a spectrometer, wherein the broadband light source is connected to the tapered SPF through the first single-mode fiber, and the tapered SPF is connected to the spectrometer through the second single-mode fiber;
    the broadband light source is configured to emit a light wave; and
    the spectrometer is configured to display a spectrum corresponding to a light wave passing through the first single-mode fiber, the tapered SPF, and the second single-mode fiber successively;
    wherein a formula for an output power of the first single-mode fiber is:

$$P''_{out} = P_x\cos^2\left(\frac{1}{2}\varphi_x\right) + P_y\cos^2\left(\frac{1}{2}\varphi_y\right),$$

wherein
P"$_{out}$ is the output power of the first single-mode fiber, $P_x$ is an optical power of an x polarization in the incident light, $P_y$ is an optical power of a y polarization in the incident light, $\varphi_x$ is a phase difference between an even mode and an odd mode in an x polarization state accumulated in a coupling region, $\varphi_y$ is a phase difference between an even mode and an odd mode in the y polarization state accumulated in the coupling region.

6. The tapered side-polished FOBS according to claim 5, wherein a taper length L of the tapered SPF ranges from 2 mm to 60 mm, a radius R of a taper waist region of the tapered SPF ranges from 0.5 pm to 10 pm, and the range of the side-polished depth d of the taper waist region after tapering the SPF is 0.5R-1.5R.

7. The tapered side-polished FOBS according to claim 1, wherein the taper length L of the tapered SPF ranges from 20 mm to 60 mm, the radius R of the taper waist region of the tapered SPF ranges from 2 pm to 10 pm, and the range of the side-polished depth d of the taper waist region after tapering the SPF is 0.5R-1R.

8. The tapered side-polished FOBS according to claim 5, wherein the tapered SPF is a non-circular symmetric fiber.

\* \* \* \* \*